UNITED STATES PATENT OFFICE.

CHARLES H. HUBBELL, OF ST. LOUIS, MISSOURI, ASSIGNOR OF THREE-FOURTHS TO FRANK J. HUNLETH, ALEXANDER KILPATRICK, AND RACHEL LOEWENSTEIN, ALL OF SAME PLACE.

MINERAL WOOL.

SPECIFICATION forming part of Letters Patent No. 453,115, dated May 26, 1891.

Application filed December 27, 1890. Serial No. 375,983. (No specimens.)

*To all whom it may concern:*

Be it known that I, CHARLES H. HUBBELL, of the city of St. Louis, in the State of Missouri, have invented a certain new and useful Improvement in Mineral Wool, of which the following is a full, clear, and exact description.

The invention consists in the use of granite with a flux in the manufacture of mineral wool.

In carrying out my invention I take about one part of granite to two parts of limestone and melt them together in a cupola or other furnace by the use of any suitable fuel. A stream of the ingredients when melted and thoroughly mixed is run out and subjected to a jet of steam, superheated or otherwise, or of air, preferably hot, and thus separated into filaments which are collected in any suitable manner.

I do not confine myself to limestone (carbonate of lime) as a flux, as burnt lime or other alkaline substance may be used. Neither do I confine myself to the proportions above given, as these proportions may be varied according to the condition of the ingredient or composition of the flux.

I claim no novelty in the process of melting the material, nor imparting to it its fibrous character, nor in means for collecting fiber; but

What I claim as new and of my invention is—

As a new article of manufacture, mineral wool composed of granite combined with a flux, in substantially the proportions set forth.

CHAS. H. HUBBELL.

In presence of—
SAML. KNIGHT,
J. M. MAROT.